N. E. CLARK.
SLITTING MACHINE.
APPLICATION FILED DEC. 28, 1907.

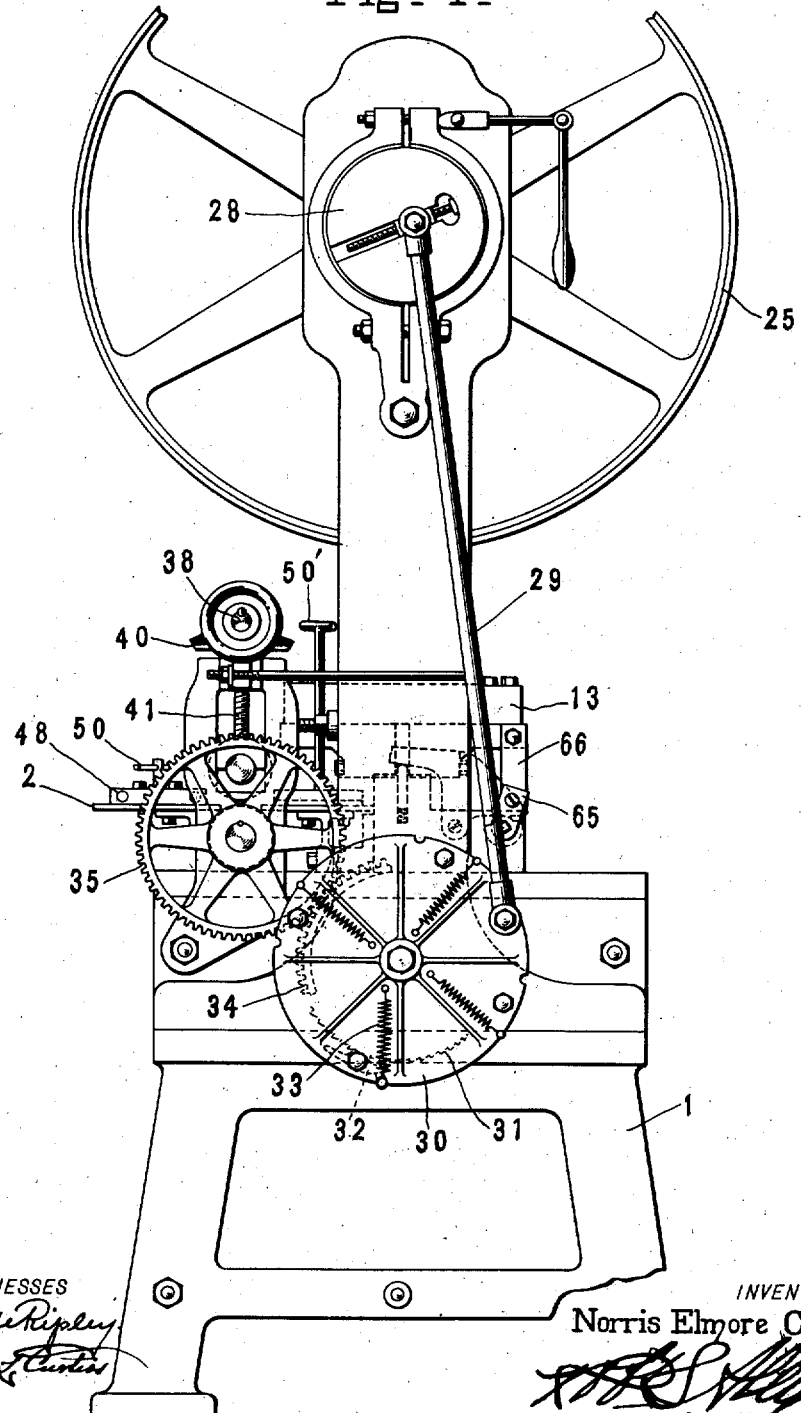

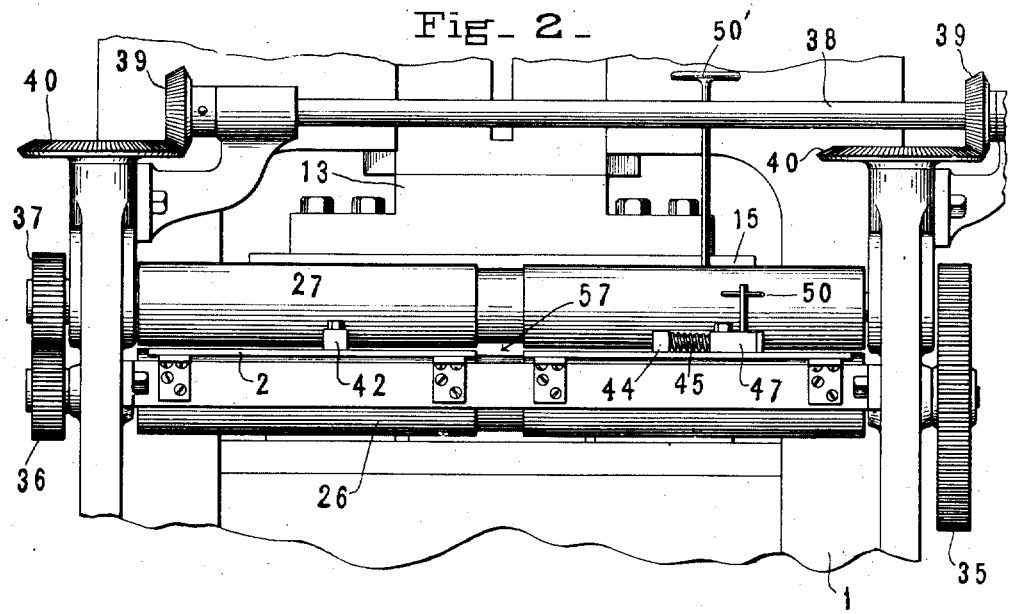
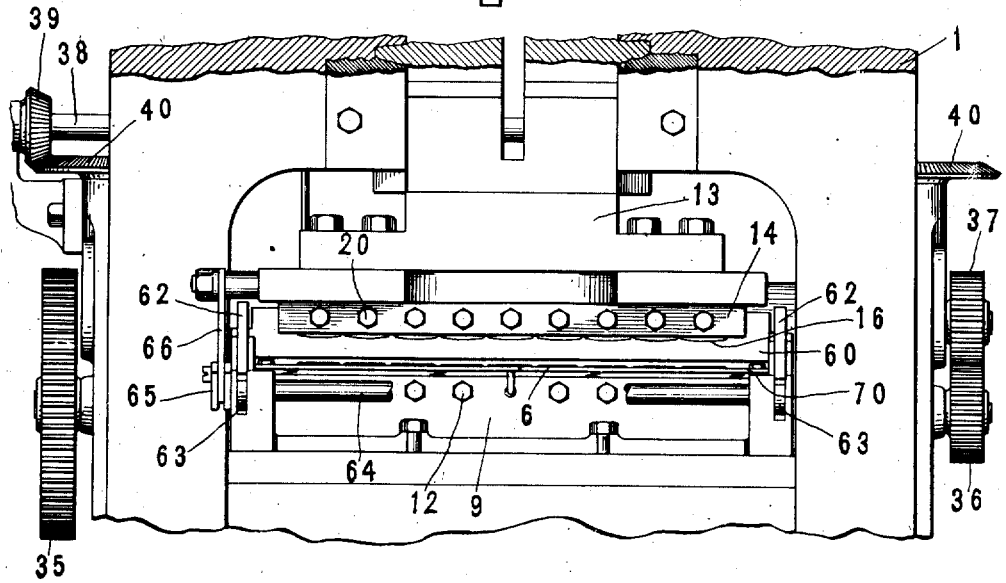

1,037,204.

Patented Sept. 3, 1912.
6 SHEETS—SHEET 3.

WITNESSES

INVENTOR
Norris Elmore Clark.
BY
ATTORNEY

N. E. CLARK.
SLITTING MACHINE.
APPLICATION FILED DEC. 28, 1907.
1,037,204.
Patented Sept. 3, 1912.
6 SHEETS—SHEET 5.
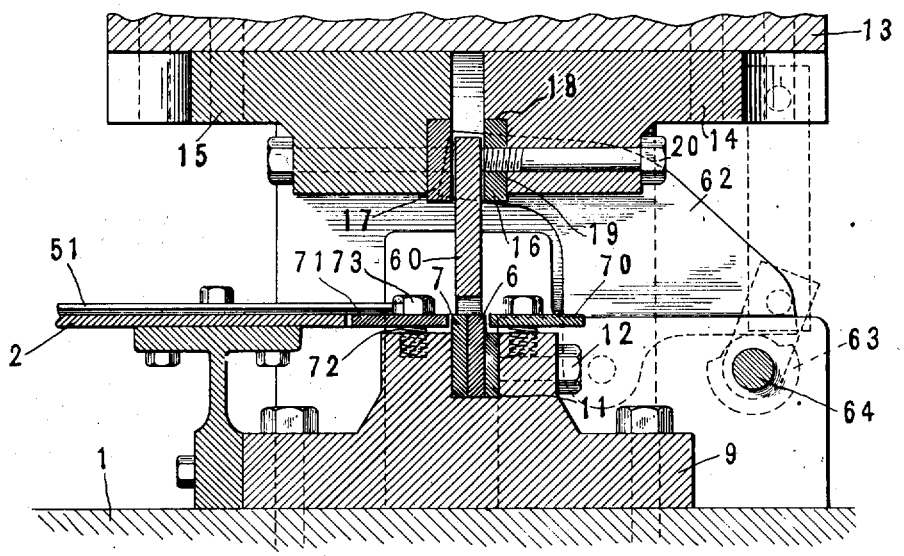
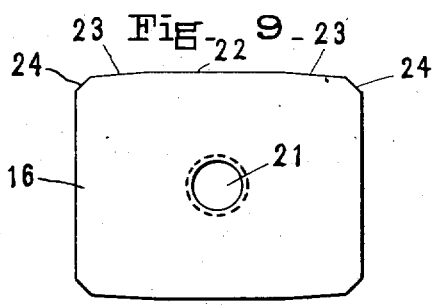
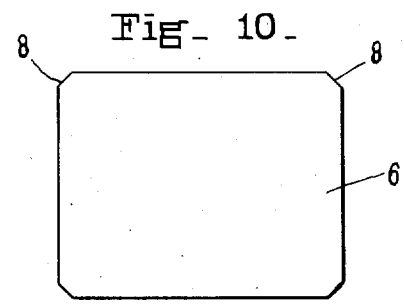
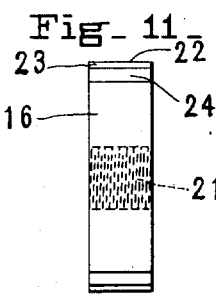
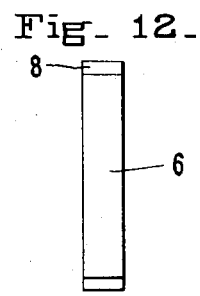
WITNESSES
J. Clyde Ripley.
George L. Curtis
INVENTOR
Norris Elmore Clark.
ATTORNEY

N. E. CLARK.
SLITTING MACHINE.
APPLICATION FILED DEC. 28, 1907.

1,037,204.

Patented Sept. 3, 1912.
6 SHEETS—SHEET 6.

WITNESSES

INVENTOR
Norris Elmore Clark.
ATTORNEY

UNITED STATES PATENT OFFICE.

NORRIS ELMORE CLARK, OF PLAINVILLE, CONNECTICUT.

SLITTING-MACHINE.

1,037,204. Specification of Letters Patent. Patented Sept. 3, 1912.

Application filed December 28, 1907. Serial No. 408,397.

*To all whom it may concern:*

Be it known that I, NORRIS ELMORE CLARK, a citizen of the United States, and resident of Plainville, in the county of Hartford and State of Connecticut, have invented certain new and useful Improvements in Slitting-Machines, of which the following is a specification.

My invention relates to metal working machines and particularly for slitting or lancing sheets or strips so as to render them susceptible to stretching, for instance, for the production of expanded metal. The cutters and the feed of the sheet are arranged so that staggered rows of slits are formed.

One object of this invention is to provide strong and durable cutters easily made and kept up.

Another object is to hold the cutters rigidly, but permit them to be readily removed and replaced.

Another object is to hold the stock securely during the cutting stroke so as to prevent slip and consequent irregularity of action.

Another object is to feed the stock regularly and straight beyond the ordinary feed rolls and hold it securely up to the cutters.

Another object is to quickly clear the stock away from the cutters.

The accompanying six sheets of drawings illustrate one embodiment of the invention as applied to a commercial type of press.

The details for accomplishing the above mentioned objects will appear more fully hereinafter.

Figure 4:
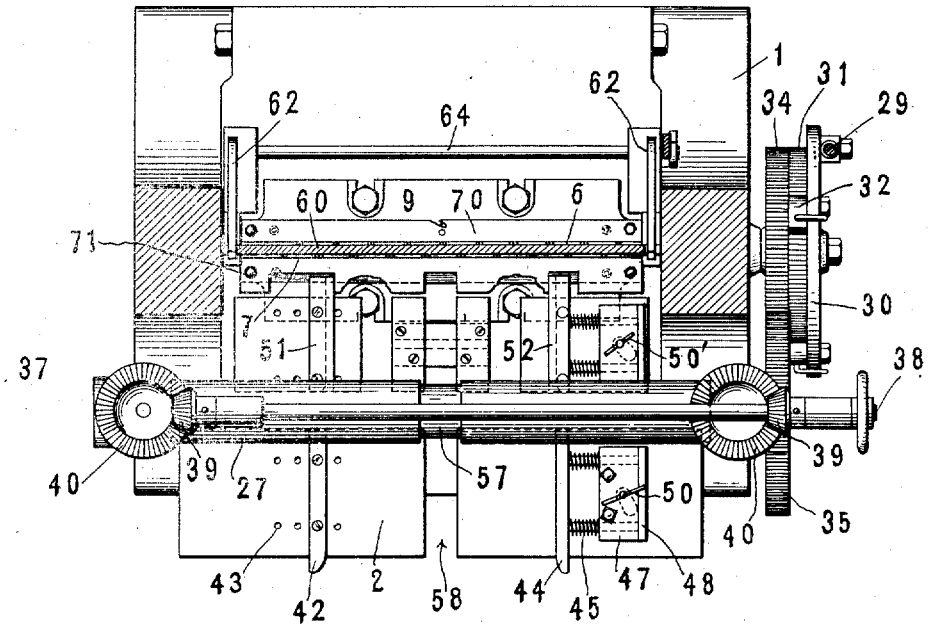
Figure 5:
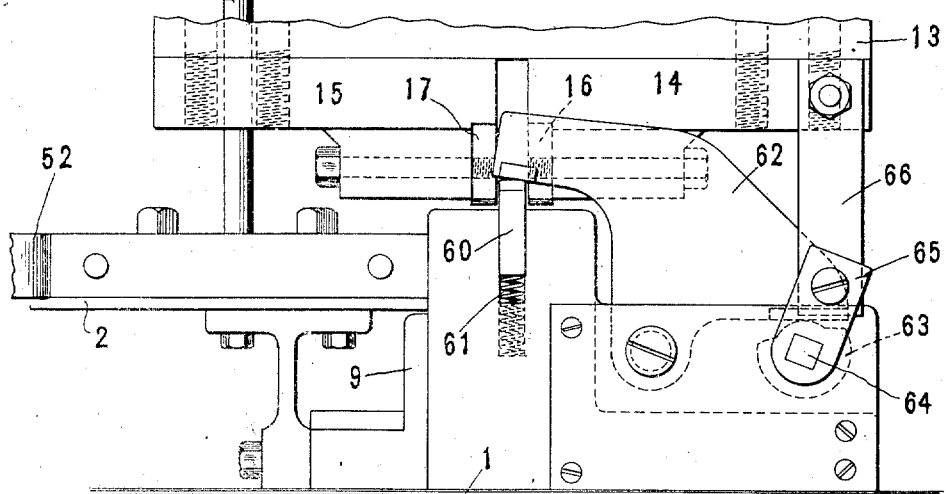
Figure 6:
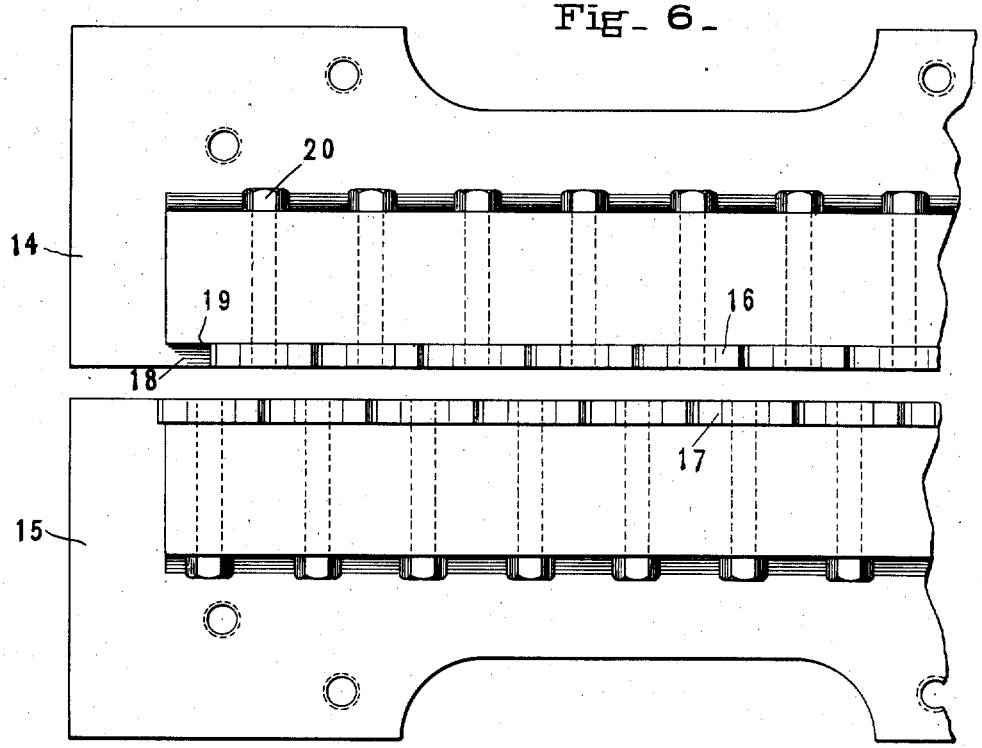
Figure 7:
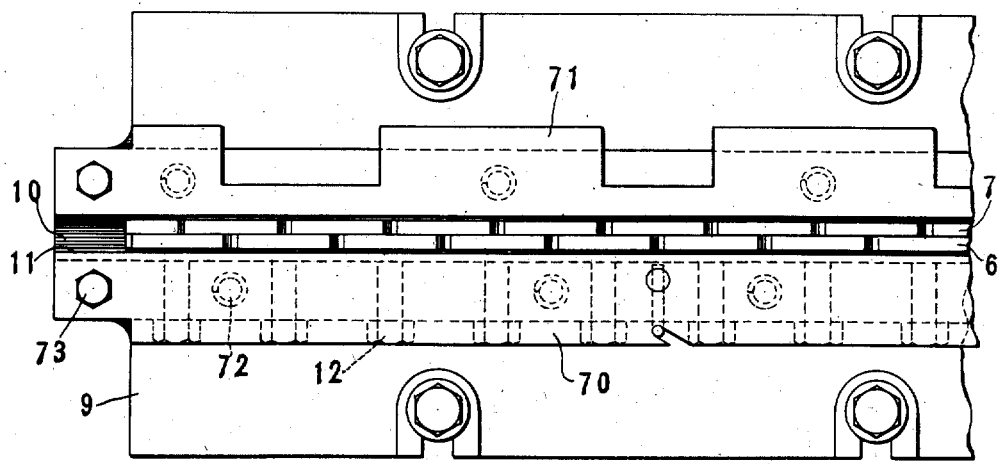
Figure 13:
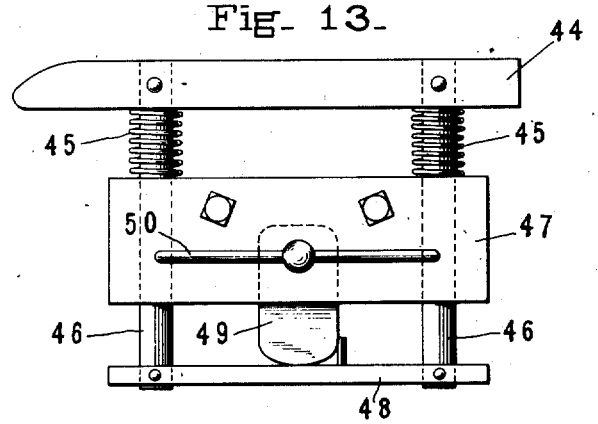
Figure 14:
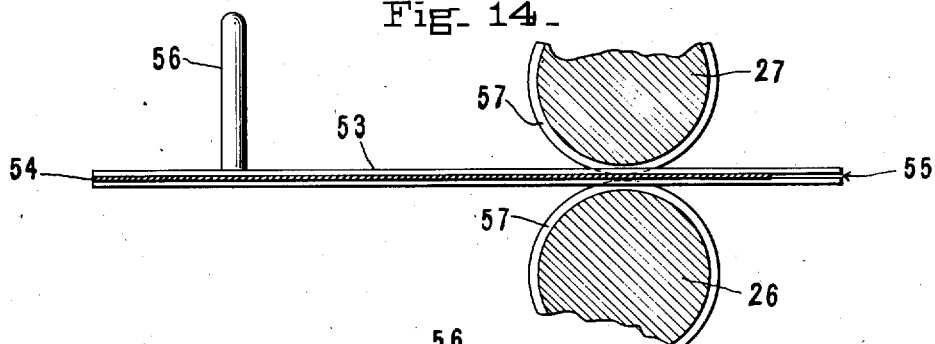
Figure 15:
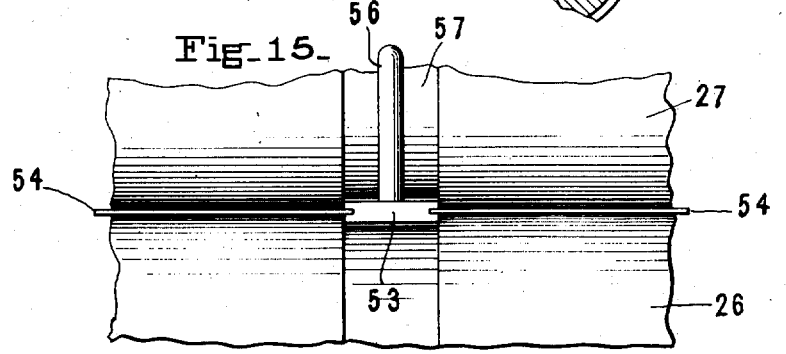
Figure 16:
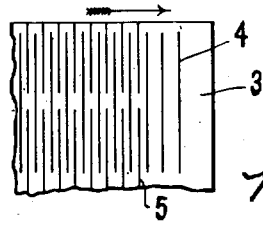

Figure 1. is a side view of a machine embodying my invention, part of the frame and fly wheel being broken away. Fig. 2. is a rear view of the feed rolls, table and gages. Fig. 3. is a front view of the cutters with the gripping bar mechanism and stripper. Fig. 4. is a plan view of the upper feed roll, table, gages and die cutters and the gripping bar in section. Fig. 5. is a side view, on a larger scale, of the cutters, table, gages and gripping bar mechanism. Fig. 6. is a bottom view of part of the punch cutters and holders. Fig. 7. is a plan view of part of the die cutters and strippers. Fig. 8. is a sectional view of the parts shown in side elevation in Fig. 5. Fig. 9. is a front view of one of the punch cutters. Fig. 10. is a front view of one of the die cutters. Fig. 11. is an end view of a punch cutter. Fig. 12. is an end view of a die cutter. Fig. 13. is a plan view of one of the spring pressed gages. Fig. 14. is a section and side view of the feed rolls and follower. Fig. 15. is a fragmentary rear view of the same. Fig. 16. is a plan view of a fragment of the product of the machine shown.

I have used the terms "punch" and "die" simply to more readily distinguish between the two sets of cutters. It will be understood that none of the stock is removed by the cutters. They simply coöperate to slit or lance the stock. Inasmuch as practically all the parts, such as the cutters, the strippers and the gripping bar, are mechanically and positively operated they might be inverted if desired in some cases as will be hereinafter understood.

The frame, 1, supports the different parts of the mechanism. The table, 2, receives the strips or sheets of material such as steel 3, and the cutters produce staggered rows of relatively short slits, such as 4 and 5, as the strip is fed step by step. The spacing, length and relative staggered arrangement of cutters may be varied so as to produce the results desired. I have selected for illustration a regular arrangement as simple and easy to comprehend.

*Cutters.*—The lower or die set consists of two rows of cutters, 6 and 7, all like the cutters shown in Figs. 10 and 12. These cutters abut against each other at the ends and have their corners beveled as at 8, so that the cut produced is the length of the cutting edge between the beveled corners. These rows of cutters are supported in staggered relation in the holder, 9, being clamped in groove, 10, with packing, 11, by bolts or screws 12, 12. The rear edge of the back row 7, and the front edge of the front row 6, constitute the cutting edges. Each cutter, however, has four cutting edges, so that it may be turned over sidewise and also upside down. The gate or head 13, carries two separate upper holders, 14 and 15, to which are secured two rows of punch cutters, 16 and 17. Each punch cutter thrusts against an abutment, 18, in its holder and is drawn against a vertical wall, 19, by a screw or bolt, 20, which screws into a tapered hole, 21. Each upper cutter has a flat central portion, 22, crowned or sloped down at 23, 23, to the beveled corners 24 24. The upper and lower faces are the same so that four cutting edges are provided and although each cutter has a shear on its lower face for causing a more gradual cut, the central flat portion on the upper face affords a secure thrust in cutting. The cutters in the two upper rows are staggered relative to each other like the lower cutters, but the two rows are spaced apart so that the front edges of the back upper row coact with the rear edges of the back row of lower cutters, while the rear edges of the front upper row coact with the front edges of the lower front row. This tends to uniformly distribute the shearing stresses and prevents the metal from creeping during the cutting stroke.

*Feed.*—Power is applied in the usual manner, for instance, to the main or fly wheel, 25, for reciprocating the gate or head, 13, in a suitable manner. The stock is fed by rolls, 26 and 27, acting intermittently. The adjustable eccentric, 28, drives the rod, 29, and pawl disk, 30. On the axis with the latter but free to move is a ratchet wheel, 31, moved step by step by one or more pawls, such as 32, carried by plate 30 and under the tension of a spring, 33. Gear, 34, is keyed to ratchet 31, and meshes with gear 35, on the end of the lower feed roll, 26. The lower roll is thus driven and transmits motion to the upper feed roll through pinions 36 and 37. Both ends of the upper roll may be raised or lowered simultaneously by rotation of shaft 38, which has bevel pinions 39, 39, meshing with gears 40, 40. Each of the latter has a screw shaft, 41, for raising and lowering the upper roll when adjusting the stock.

*Gages.*—In back of the feed rolls is a pair of gages. One gage, 42, is adapted to be moved and secured at any one of a series of holes such as 43, depending on the width of stock. For any given width of stock and operation, the gage, 42, may be considered as fixed or stationary. The other gage, 44, is pressed toward the first by a pair of springs such as 45, 45, on the rods 46, 46, which pass through the stationary base 47, and are secured together by bar 48. This gage may be retracted by turning the cam, 49, by the handle 50. (See Fig. 13, in which position the gage is inoperative.) Between the feed rolls and the cutters is another pair of somewhat similar gages, 51 and 52, one adjustable when necessary and the other spring pressed like gage 44, and retractable by handle 50'. These front gages are, however, undercut as shown dotted in Fig. 4 and in Fig. 8, so as to hold down the edge of the stock up near the cutter and prevent the edges from flying up when the steel passes out from the feed rolls. These two sets of gages enable the operator to start the sheet straight when the upper feed rolls are raised.

*Supplemental feed.*—While it is impossible to arrange the feed rolls up close to the cutters, I accomplish a very complete and accurate feed by means of a follower after the sheet leaves the feed rolls. The body, 53, has two loosely hinged or pivoted side flanges, 54, 54, of substantially the thickness of the stock and adapted to be fed by the rolls. The front end of the body is longer than the flanges and has a narrow slot, 55, to receive the rear edge of the stock. The projection, 56, serves to prevent the follower from passing through the rolls. Both rolls are centrally grooved about their peripheries as at 57, 57, to accommodate the body of the follower. The table, 2, is also grooved or provided with a guide passage, 58, for the follower body. This enables the operator to quickly center the follower when applying it just before the end of the strip passes between the rolls.

*Holding.*—To hold or grip the stock during the cutting, I provide a bar, 60, which is normally held up between the rows of upper cutters by springs such as 61. Just before the descent of the punch cutters this gripping bar, 60, is forced down by rockers, 62, 62, moved by cams 63, 63, on shaft 64. This shaft is worked by crank 65 and link 66, from the gate or head 13. This bar, 60, in conjunction with the peculiar arrangement of cutters, serves to eliminate slip and produce uniform results.

*Stripping.*—When the gripping bar is released and just before the feed occurs, a pair of stripper plates, 70 and 71, are pressed upward by springs such as 72, so, as to clear the stock from the die cutters and lift the stock above the level of the cutter faces so as to afford support for the stock during the feeding step. Bolts, such as 73, act as guides and stops for the stripper plates to limit their upward movement.

With this machine accurate results may be had without the expense of lateral feed. The supplemental feed makes it possible to utilize practically all the stock. While in some work it may be possible to use a pair of feeding away rolls in front of the cutters, I do not consider it practical for accurate work and short feeds, largely because of the great elasticity of the slitted product.

What I claim is:—

1. In a slitting mechanism two rows of lower cutters, two separate upper holders, a row of upper cutters mounted in one holder in rear of the back row of lower cutters, and another row of upper cutters mounted in the other holder in front of the front row of lower cutters, the back and front rows being in staggered relation.

2. In a slitting mechanism, two independently mounted upper holders and a row of cutters carried by each holder independently of the other holder, the cutters of one holder being staggered relative to the others.

3. In a slitting mechanism, a grooved holder, rows of cutters held therein, two separate opposite holders and a row of cutters held by each separate holder, one row being in rear and the other row in front of the first set of cutters and means for feeding a sheet transversely to said cutters.

4. In a slitting mechanism, two sets of cutters one set being divided into two rows to receive the other set between the two rows, a stripper between said rows and a stripper on each side thereof and means for feeding a sheet transversely of said rows.

5. In a slitting machine, two lower rows of relatively staggered cutters, a row of upper cutters in back of the back row of lower cutters, and a row of upper cutters in front of the front row of lower cutters.

6. In a slitting machine, two lower rows of relatively staggered cutters, a row of upper cutters in back of the back row of lower cutters, and a row of upper cutters in front of the front row of lower cutters, and a gripping bar for holding the stock down on the lower cutters.

7. In a slitting machine, a set of staggered cutters, two rows of opposite cutters, a gripping bar movable between the latter rows of cutters, and means independent of the cutters for operating said bar and holding it positively during the cutting stroke.

8. In a slitting machine, two rows of staggered cutters, two rows of opposite cutters one set being movable, a spring pressed transverse bar between two rows of the cutters, and means for positively moving the bar in advance of the cutting movement of the movable cutters and holding it.

9. In a slitting machine, two rows of staggered cutters, two rows of opposite cutters one set being movable, a spring pressed transverse bar between two rows of the cutters, and means for positively moving the bar in advance of the cutting movement of the movable cutters and holding it, and releasing the bar after the beginning of the retraction of the movable cutters.

10. In a slitting machine, a set of cutters, a gripping bar, a shaft, two cams thereon, and a rocker operated by each cam to force said bar on to the cutters.

11. In a slitting machine, punch and die cutters, a reciprocating gate carrying the punch cutters, a gripping bar, a cam shaft, rockers operated thereby to force down said bar, and means of connection between said gate and cam shaft to move the bar down in advance of the gate and to release the bar after the beginning of the ascent of the gate.

12. In a slitting machine, two rows of lower cutters, spring pressed stripper plates in back and in front thereof, two rows of upper cutters, one row in back of the lower back cutters and the other row in front of the lower front cutters.

13. In a slitting machine, two rows of lower cuters, spring pressed stripper plates pressed stripper plate between the table and cutters and normally held on a level above the top of the cutters, and a row of upper cutters in back and one row in front of the lower cutters.

14. In a slitting machine, two rows of lower cutters, spring pressed stripper plates in back and in front thereof, two rows of upper cutters one row in back of the lower back cutters and the other row in front of the lower front cutters, and a gripping bar between the upper cutters for holding the stock down on the lower cutters.

15. In a slitting machine, two rows of lower cutters, a guide table and a spring pressed stripper plate between the table and cutters and normally held on a level above the top of the cutters, and a row of upper cutters in back and one row in front of the lower cutters, and a gripping bar for holding the stock down on the lower cutters.

16. In a slitting machine, a pair of feed rolls, upper and lower sets of staggered cutters, a relatively stationary gage, a spring pressed gage, and a cam for retracting and holding the latter.

17. In a slitting machine, upper and lower staggered cutters, feed rolls, a guide table, a spring pressed lateral gage at one side of the table, and a relatively stationary but adjustable gage at the opposite side.

18. In a slitting machine, upper and lower staggered cutters, a pair of feed rolls, a guide table, spring pressed lateral gages in rear and in front of said rolls, and a relatively stationary gage opposite each spring pressed gage.

19. In a slitting machine, upper and lower staggered cutters, a pair of feed rolls, a guide table, spring pressed lateral gages in rear and in front of said rolls, and a relatively stationary gage opposite each spring pressed gage, the front gages being undercut to hold down the end of the sheet after it leaves the feed rolls.

20. In a slitting machine, upper and lower staggered cutters, a pair of feed rolls, a guide table, spring pressed lateral gages in rear and in front of said rolls, and a relatively stationary gage opposite each spring pressed gage, and a follower for feeding the sheet beyond the feed rolls.

21. In a slitting machine, a pair of grooved feed rolls, upper and lower cutters, a guide table having a passage in line with the grooved feed rolls, and a follower having a portion guided in said passage.

22. In a slitting machine, a pair of grooved feed rolls, upper and lower cutters, a guide table having a passage in line with the grooved feed rolls, and a follower having a portion guided in said passage, and side flanges adapted to be fed by the rolls.

23. In a slitting machine, a pair of grooved feed rolls, upper and lower cutters, and a follower having a body and side flanges, the body extending beyond the side flanges and having a transverse sheet receiving slot.

24. In a slitting machine, upper and lower staggered cutters, feed rolls, gages between the rolls and cutters, and means for engaging an unslitted portion of a sheet to feed it beyond the rolls and between the gages.

25. In a slitting machine, upper and lower cutters, feed rolls, gages between the rolls and cutters, one of the gages being movable and a follower adapted to feed a sheet beyond the rolls and having a transverse groove to receive the sheet but to permit the sheet to be held under lateral pressure by the movable gage.

26. In a slitting machine, upper and lower cutters, feed rolls, lateral gages between the rolls and cutters having undercut portion to hold down the side edges of a sheet, and a follower having a grooved front end to engage the central portion of the end of a sheet and feed it beyond the rolls.

27. In a slitting machine, a pair of sheet feeding rolls, upper and lower sets of cutters for forming double rows of slits in relatively staggered relation across the sheet, and means for engaging an unslitted portion of the sheet and further feeding the sheet after it has passed through the feed rolls.

28. In a slitting machine, a pair of feed rolls, upper and lower sets of transverse cutters arranged to cut relatively staggered slits, and a follower engaged by the feed rolls for feeding the stock beyond the rolls.

29. In a slitting machine, a pair of feed rolls with circumferential grooves, cutters for forming staggered rows of slits and a follower comprising a body with side flanges.

30. In a slitting machine, a pair of feed rolls with circumferential grooves, cutters for forming staggered rows of slits, and a follower comprising a body with hinged side flanges.

31. In a slitting machine, a pair of feed rolls with circumferential grooves, cutters for forming staggered rows of slits, and a follower comprising a body with side flanges, and a stop for engaging the feed rolls.

32. Slitting mechanism comprising punch and die members each having two transverse cutting edges one of said members being formed in two parts adapted to receive the other member between the parts, the cutting edges of one member being interrupted at intervals, the interruptions of one edge being opposite the cutting portions of the other edge.

33. Slitting mechanism comprising punch and die members each having two transverse cutting edges one of said members being formed in two parts adapted to receive the other member between the parts, a mechanically operated gripper between the parts of said two part member, the cutting edges of one member being interrupted at intervals, the interruptions of one edge being opposite the cutting portions of the other edge.

34. Slitting mechanism comprising two sets of coöperating cutters, one set being stationary and the other set movable relative thereto, the cutters of one set being spaced apart just sufficient to receive the other set, the front and rear edges of said second set coacting with the inner edges of the first set and feed rolls arranged substantially parallel to the cutting edges for feeding stock transversely to the cutting edges.

35. Slitting mechanism comprising two sets of coöperating cutters, the cutters of one set being spaced apart just sufficient to receive the other set, the front and rear edges of said second set coacting with the inner edges of the first set and a gripper arranged to operate between the spaced cutters and hold the stock against the opposite cutters.

36. Slitting mechanism comprising two sets of coöperating cutters, one set being stationary and the other set movable relative thereto, the cutters of one set being spaced apart just sufficient to receive the other set, the front and rear edges of said second set coacting with the inner edges of the first set and strippers arranged adjacent the edges of the second set of cutters.

37. Slitting mechanism comprising two sets of coöperating cutters, one set being stationary and the other set movable relative thereto, the cutters of one set being spaced apart just sufficient to receive the other set, the front and rear edges of said second set coacting with the inner edges of the first set, a gripper between said spaced cutters and strippers adjacent the outer edges of the other cutters.

38. In a slitting mechanism two independently mounted holders and a row of cutters carried by each holder independently of the other holder, the cutters of one holder being staggered relative to the others and spaced apart therefrom.

39. In a slitting machine, a support, two holders independently connected thereto, a row of cutters carried by each holder and a transverse gripping bar movable between said rows of cutters.

40. In a slitting machine, a lower set of cutters, a yielding stripping plate arranged in rear thereof, an upper set of cutters, a transversely extending gripping bar, a movable gate carrying one of said sets of cutters and a cam operated device connected to said gate for moving said gripping bar.

41. In a slitting machine, a set of cutters arranged in two rows spaced apart from each other, another set of cutters arranged to fit between the rows of the first set of cutters, holding and stopping devices for preventing the stock from sticking to either of said sets of cutters and means for feeding the sheet of stock transversely to said rows of cutters.

NORRIS ELMORE CLARK.

Witnesses:
EDUARD E. ASPINALL,
FRANK H. GAINER.

Correction in Letters Patent No. 1,037,204.

It is hereby certified that in Letters Patent No. 1,037,204, granted September 3, 1912, upon the application of Norris Elmore Clark, of Plainville, Connecticut, for an improvement in "Slitting-Machines," an error appears in the printed specification requiring correction as follows: Page 3, line 72, strike out the words "cuters, spring pressed stripper plates" and insert the words *cutters, a guide table and a spring;* and that the said Letters Patent should be read with this correction therein that the same may conform to the record of the case in the Patent Office.

Signed and sealed this 24th day of September, A. D., 1912.

[SEAL.]

C. C. BILLINGS,
*Acting Commissioner of Patents.* cutters, a yielding stripping plate arranged in rear thereof, an upper set of cutters, a transversely extending gripping bar, a movable gate carrying one of said sets of cutters and a cam operated device connected to said gate for moving said gripping bar.

41. In a slitting machine, a set of cutters arranged in two rows spaced apart from each other, another set of cutters arranged to fit between the rows of the first set of cutters, holding and stopping devices for preventing the stock from sticking to either of said sets of cutters and means for feeding the sheet of stock transversely to said rows of cutters.

NORRIS ELMORE CLARK.

Witnesses:
EDUARD E. ASPINALL,
FRANK H. GAINER.

---

Correction in Letters Patent No. 1,037,204.

It is hereby certified that in Letters Patent No. 1,037,204, granted September 3, 1912, upon the application of Norris Elmore Clark, of Plainville, Connecticut, for an improvement in "Slitting-Machines," an error appears in the printed specification requiring correction as follows: Page 3, line 72, strike out the words "cuters, spring pressed stripper plates" and insert the words *cutters, a guide table and a spring;* and that the said Letters Patent should be read with this correction therein that the same may conform to the record of the case in the Patent Office.

Signed and sealed this 24th day of September, A. D., 1912.

[SEAL.]

C. C. BILLINGS,
*Acting Commissioner of Patents.*

It is hereby certified that in Letters Patent No. 1,037,204, granted September 3, 1912, upon the application of Norris Elmore Clark, of Plainville, Connecticut, for an improvement in "Slitting-Machines," an error appears in the printed specification requiring correction as follows: Page 3, line 72, strike out the words "cuters, spring pressed stripper plates" and insert the words *cutters, a guide table and a spring;* and that the said Letters Patent should be read with this correction therein that the same may conform to the record of the case in the Patent Office.

Signed and sealed this 24th day of September, A. D., 1912.

[SEAL.]

C. C. BILLINGS,

*Acting Commissioner of Patents.*